A. G. WHITE.
ANTI-FRICTION BEARINGS.

No. 174,331. Patented Feb. 29, 1876.

Witnesses
Jo. P. Connolly
H. A. Connolly

Inventor
Anderson G. White
By Connolly Bros.
Attorneys

UNITED STATES PATENT OFFICE.

ANDERSON G. WHITE, OF PITTSBURG, PENNSYLVANIA, ASSIGNOR OF ONE-HALF HIS RIGHT TO JOHN BIGLEY, OF SAME PLACE.

IMPROVEMENT IN ANTI-FRICTION BEARINGS.

Specification forming part of Letters Patent No. 174,331, dated February 29, 1876; application filed July 20, 1875.

*To all whom it may concern:*

Be it known that I, ANDERSON G. WHITE, of Pittsburg, in the county of Allegheny and State of Pennsylvania, have invented certain new and useful Improvements in Anti-Friction Bearings; and I do hereby declare the following to be a full, clear, and exact description of the invention, such as will enable others skilled in the art to which it pertains to make and use it, reference being had to the accompanying drawings, which form part of this specification, in which—

Figure 1:
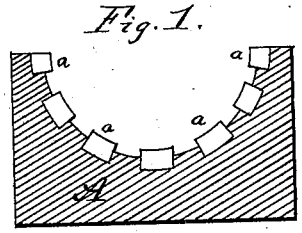
Figure 2:
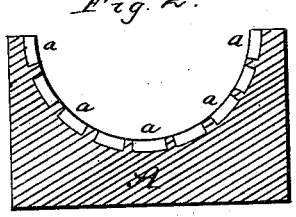
Figure 3:
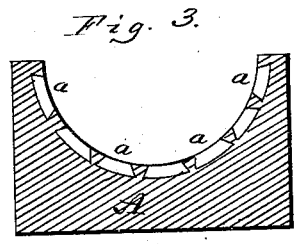
Figure 4:
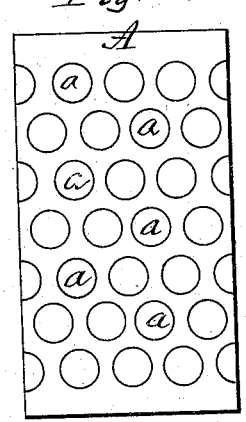
Figure 5:
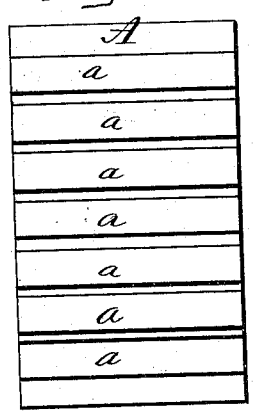
Figure 6:
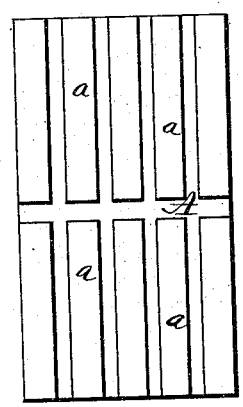

Figure 1 is a transverse section, showing raised studs. Fig. 2 is a transverse section, showing studs flush. Fig. 3 is a like section, showing dovetailed slips. Fig. 4 is a plan view of flat bearing, showing studs. Fig. 5 is a like view, showing raised transverse slips. Fig. 6 is a like view, showing raised longitudinal slips of the buck-horn.

This invention relates to new and useful improvements in lining or facing for axle-bearings, journal-boxes, or any part of machinery where sliding friction is produced. It consists in laying, or, as it were, paving the bearing-surface with studs or blocks of buck-horn, or the horns of solid-horned animals, previously shaped to fit corresponding recesses in the bearing-surface.

There are two kinds of horn—cellular and laminated. The first can be used only in its natural state; while the second, by reason of its laminated structure, can be readily separated into sheets, softened and molded, or otherwise worked. The cellular horn—*i. e.*, that of the stag and other deciduous animals—I make use of on account of its containing a sort of natural lubricant, which enables it to withstand an extraordinary amount of wear with no perceptible diminution in size. Therefore it is admirably adapted to the bearings specified for anti-frictional purposes.

Referring to the accompanying drawings, I apply it as follows: A are bearings for axles, journals, or other sliding friction-surfaces. The surfaces of these I recess, either by boring, grooving, or, in any way, cutting. Even the whole surface may be lined continuously. Into the recesses or cuts I accurately adjust pieces of cellular horn *a*, leaving their exposed surfaces either flush with the bearing-surface or slightly above it. In the latter case the spaces between form an air-cushion for the journal or other part of a machine. Adapted in this manner the lining will stand for years without any perceptible wear occurring.

I am aware that a patent has, on March 12, 1861, been issued to Joseph Cordnan for a lining of horn, viz: "a piece of horn of the desired shape is boiled in oil and water until it is soft and pliable, when it is pressed into a recess in the journal-box," and so claimed; but laminated horn alone is affected by boiling. No amount of boiling will soften or render pliable the cellular horn which I use, and that is the kind I wish to be understood as referring to. I therefore disclaim the material patented to Cordnan *in toto;* but What I do claim, and desire to secure by Letters Patent, is—

As a surface-lining for frictional bearings, the within-described cellular stag-horn, used in its natural state, and applied in the manner and for the purpose substantially as described and shown.

In testimony that I claim the foregoing I have hereunto set my hand this 15th day of July, 1875.

ANDERSON G. WHITE.

Witnesses:
T. J. McTIGHE,
FRANK. A. POLLOCK.